United States Patent [19]
Caldwell, Jr.

[11] 3,773,085
[45] Nov. 20, 1973

[54] NOISE SUPPRESSING THROTTLING VALVE

[75] Inventor: William C. Caldwell, Jr., Brookhaven, Pa.

[73] Assignee: Westinghouse Electric Corporation, Pittsburgh, Pa.

[22] Filed: Jan. 14, 1971

[21] Appl. No.: 106,332

[52] U.S. Cl............................ 137/630.15, 137/625.3
[51] Int. Cl.................................................. F16k 1/54
[58] Field of Search................ 137/630.11, 630.14, 137/630.15, 630.22, 630, 625.3

[56] References Cited
UNITED STATES PATENTS

| | | | |
|---|---|---|---|
| 1,480,873 | 1/1924 | Wagner | 137/630.11 |
| 938,491 | 11/1909 | Knauf | 137/630.14 |
| 2,201,752 | 5/1940 | Winberg | 137/630.14 |
| 2,392,741 | 1/1946 | Hurlburt | 137/630.14 X |
| 3,219,059 | 11/1965 | Williams et al. | 137/625.3 |

Primary Examiner—Robert G. Nilson
Attorney—A. T. Stratton, F. P. Lyle and F. Cristiano, Jr.

[57] ABSTRACT

A noise suppressing steam throttle valve comprises a pair of concentric seats and plugs, the inner seat and plug being disposed within the outer plug, and a plurality of ducts disposed in the outer plug for the steam to flow from upstream of the outer plug to upstream of the inner seat. Upon opening the valve, the inner plug moves upwardly allowing steam to flow through an increasing number of ducts as it opens, and opens fully before the outer plug moves off the outer seat. The ducts break up the steam flowing therethrough into small discrete jets which reduce the noise caused by the high pressure drop across the inner seat at low lifts. When the outer plug lifts off its seat the quantity of steam flowing through the ducts decreases until it approaches zero flow as the outer plug approaches its fully open position, thus minimizing the pressure drop across the fully open valve by allowing unrestricted flow across the outer seat.

8 Claims, 3 Drawing Figures

Patented Nov. 20, 1973

WITNESSES
Theodore F. Wrobel
Fred J. Bachr Jr

INVENTOR
William C. Caldwell, Jr.
BY
Frank Cristiano Jr.

Patented Nov. 20, 1973

NOISE SUPPRESSING THROTTLING VALVE

BACKGROUND OF THE INVENTION

This invention relates to noise suppressing valves and more particularly to a steam control valve having the noise suppressor disposed in a two piece valve plug and having a positive latching device which causes the two pieces of the plug to act in unison during emergency fast closing operations. With larger and larger capacity steam turbines the size of the throttling valve has increased to handle the large quantity of steam flowing into the turbine. Such valves in order to control the steam flow to the turbine necessarily operate over a wide range of pressure drop, i.e., from about 2 percent when the valve is fully open to 100 percent when the valve is fully closed. Pressure drops in excess of 50 percent normally create extremely high noise levels and vibration. Thus, it has been found necessary to provide some device in the valve which will reduce the intensity of the noise and vibration, however, the devices herebefore provided resulted in slightly higher pressure drops when the valve was fully open. This reduces the efficiency of the turbine and therefore is not desirable.

BRIEF SUMMARY OF THE INVENTION

In general, a noise suppressing throttling valve made in accordance with this invention comprises a body having inlet and outlet passages, a first valve seat disposed between said inlet and outlet passages and providing a fluid passageway therebetween, a first valve plug having a central opening and an annular seating surface which registers with an annular seating surface on the first valve seat to stop the flow of fluid passing the seating surfaces from flowing from the inlet to the outlet passage, a second valve seat disposed in the central opening of the first valve plug and a second valve plug disposed in the central opening and having an annular seating surface, which registers with an annular seating surface on the second valve seat to stop the flow of fluid passing the second seating surfaces from flowing from the central opening to the outlet passage. A plurality of ducts are disposed in the first plug to provide conduits which are progressively exposed as the second plug separates from its seat to allow fluid to flow from the inlet port into the central opening of the first plug. Such a valve further comprises a valve stem fastened to the second plug and has the first and second plug cooperatively associated in such a manner that when opening the valve, the second plug lifts off the second seat and opens fully before the first plug lifts off the first seat and when closing the valve, the first plug contacts the seat blocking the flow of fluid before the second plug begins to throttle the steam flow.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
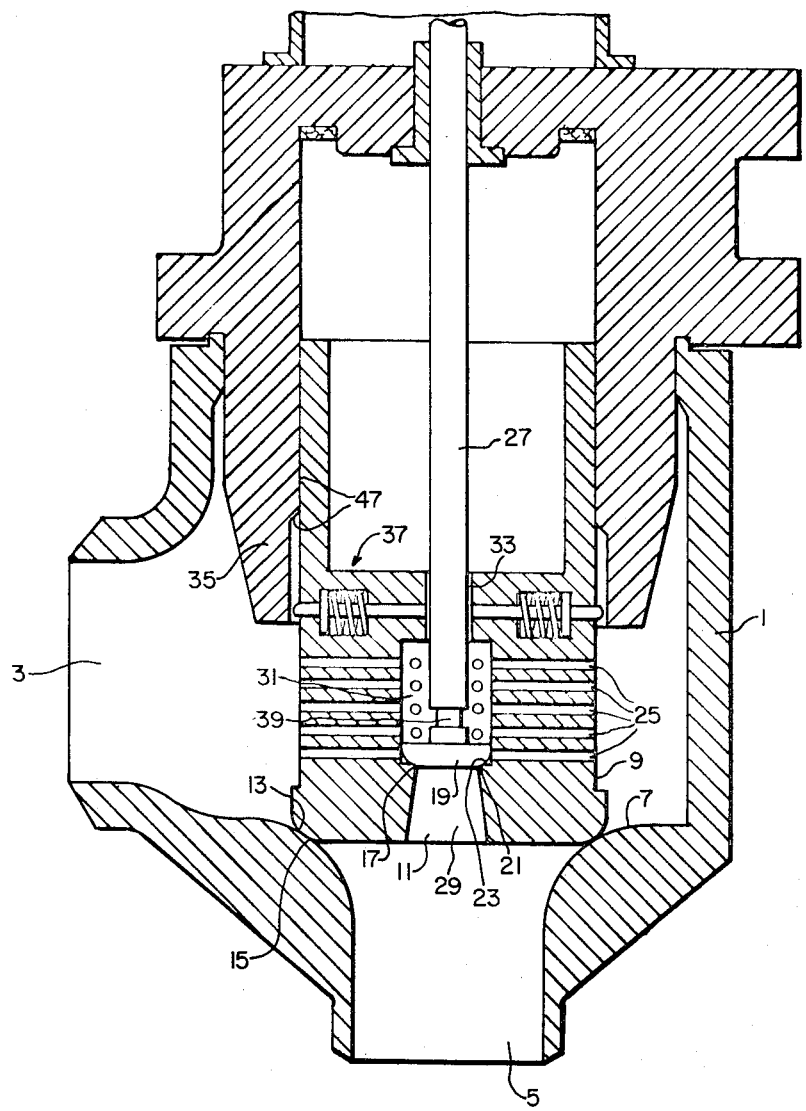
FIG. 1 is a fragmentary sectional view of a noise suppressing valve in its fully closed position incorporating the invention.
Figure 2:
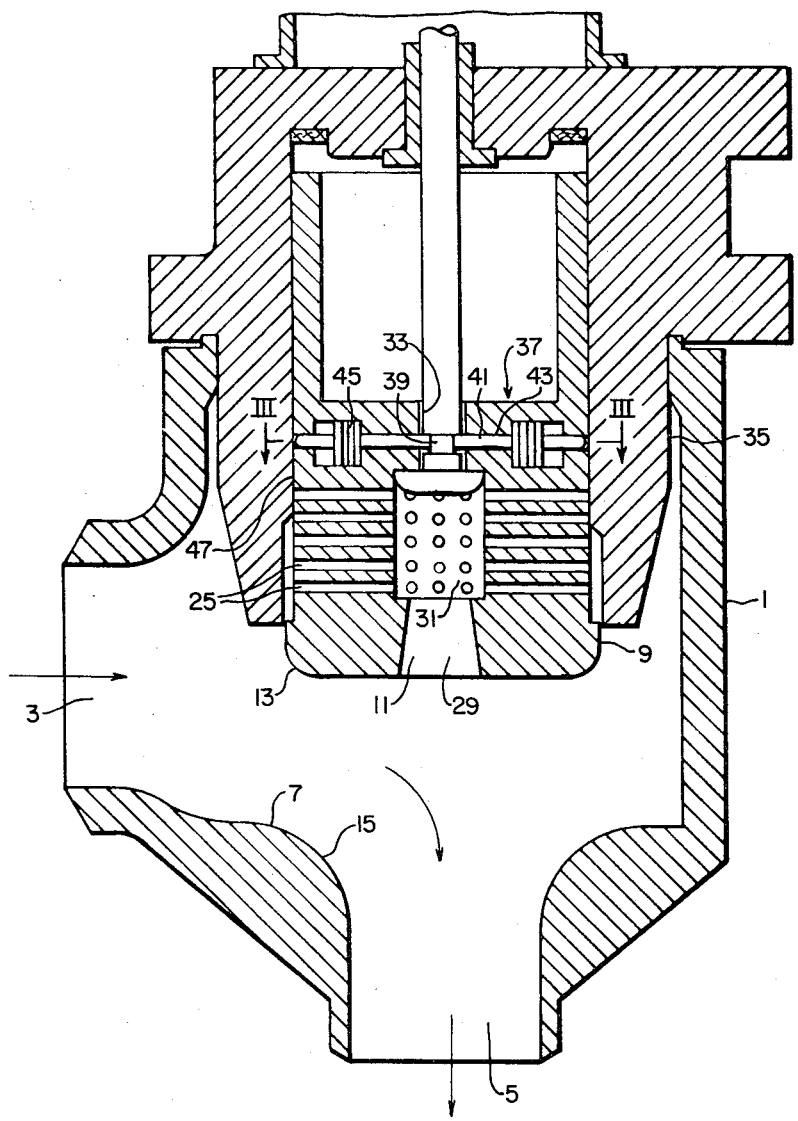
FIG. 2 is a fragmentary sectional view of the valve in its fully open position.

Referring now to the drawings in detail, FIGS. 1 and 2 show a portion of a steam throttling valve made in accordance with this invention. The valve comprises a body 1 having inlet and outlet passages 3 and 5, and a first or outer valve seat 7, disposed between the inlet and outlet passages 3 and 5 and providing a fluid or steam passageway therebetween. A first or outer valve plug 9 has a central opening 11 and an annular seating surface 13, which registers with an annular seating surface 15 on the first valve seat 7, for blocking the flow of steam passing the seating surfaces 13 and 15.

A second or inner valve seat 17 and a second or inner valve plug 19 are disposed in the central opening 11. The inner valve seat and plug 17 and 19 each have annular seating surfaces 21 and 23, respectively, which register with each other for blocking the flow of steam from the central opening 11 to the outlet passage 5. A plurality of rows of ducts 25 extend radially from the central opening 11 and provide throttling conduits for steam to flow from the inlet passage 3 into the central opening 11. As the inner plug moves away from its seat steam flows through an increasing number of these ducts.

As shown in the drawings, a valve stem 27 is fastened to the second or inner plug 19 and is concentric with the axis of the first plug 9. The central opening 11 of the outer plug 9, which receives the inner plug 19 and valve stem 27, has three portions: a diverging portion 29, which begins to diverge adjacent the second or inner seat 17 and serves as a diffuser for steam flowing to the outlet passage 5; a central cylindrical portion 31 having a relatively large diameter for receiving the inner plug, which has a diameter only slightly smaller than the cylindrical portion; and a guide portion 33 through which the stem 27 slides freely. The inner plug 19 is so disposed with respect to the outer plug 9 that it contacts and lifts the outer plug off its seat only after the inner plug has reached the fully open position. FIGS. 1 and 2 show a guideway 35 disposed in the valve body for aligning the seating surface 13 of the first plug 9 with the seating surface 15 of the first seat 7.

Figure 3:
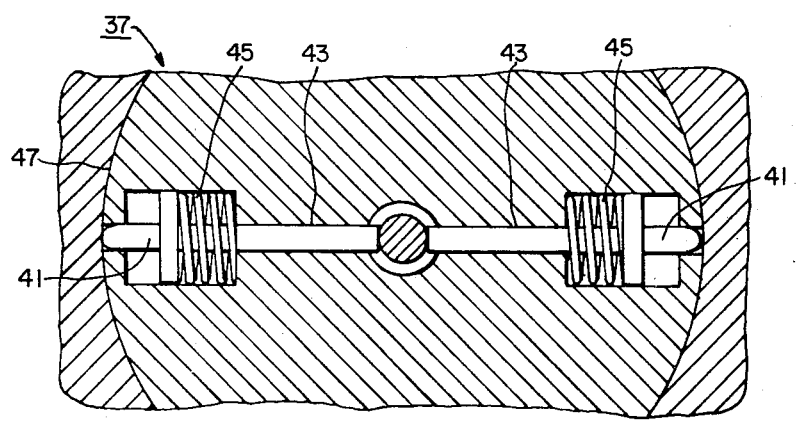
FIG. 3 is an enlarged fragmentary sectional view taken on line III—III of FIG. 2.

As shown in FIG. 3, a latching device, generally indicated at 37, comprises a circumferential groove 39 in the valve stem 27, rods 41 slidably mounted in radially extending bores 43 in the outer plug 9, and springs 45 for biasing the rods 41 radially outwardly. Cam surfaces 47 on the guideways 35, as shown in FIGS. 1 and 2, cause the rods 41 to move inwardly and register with the circumferential groove 39 in the valve stem 27 after the outer plug is moved off its seat by the stem rising beyond a position where the inner plug contacts the outer plug, thus locking the plugs together, so that they act in unison until the outer plug again approaches the seat 7 in a downward direction. The cam surfaces 47 allow the rods to move outwardly and disengage the grooves in the stem, so that the inner plug moves independently of the outer plug when the outer plug is seated.

Thus, upon opening of the valve, the inner plug 19 lifts off the inner seat 17 and steam flows from the inlet passage 3 through a progressively greater number of ducts 25 as the plug 19 rises. The ducts 25 throttle the steam and break the flow into small discrete jets reducing the noise intensity of the steam as it flows through the ducts, into the central opening 11, across the seating surfaces 21 and 23 and out the outlet passage 5. As the valve stem continues to rise, the inner plug 19 contacts the outer plug 9 adjacent the guide portion 33 and begins to lift the outer plug 9 off its seat 7. The cam surfaces 47 cause the rods 41 to move inwardly and engage the groove 39 in the valve stem 27 locking the inner and outer plugs so that they act in unison. As the stem 27 and the plug 9 continue to rise, the ducts 25 are moved out of the flow path of the steam, thus reducing the pressure drop across the valve as it approaches its fully open position. Upon closing, the inner and outer plugs 19 and 9, respectively, move in unison until just before the outer plug 9 seats and then the cam surfaces 47 allow the rods 41 to move outwardly, under the bias of the springs 45, unlatching the plugs. Once the outer plug 9 seats itself the inner plug 19 is moved by the stem 27 independently of the outer plug 9.

Having the plugs latched together when the valve is fully open, allows the stem to impart a closing force directly to the outer plug for closing the valve quickly upon some malfunction of the turbine or its associated equipment. The inner plug may be lifted off its seat by a relatively small force compared to the force that would be required to initially lift a plug, the diameter of the outer plug, sized for the total flow through the valve. By the time the outer plug is ready to be lifted off its seat the pressure drop across the outer plug is considerably reduced, thus reducing the force required to lift the outer plug. There are no piston rings to gall and leak in valves made in accordance with this invention as there normally are in valves of this type employing a single plug.

What is claimed is:

1. A noise suppressing throttle valve comprising
a body having inlet and outlet fluid passages;
a first valve seat disposed between said inlet and outlet passages and providing a fluid passageway therebetween;
a first valve plug having a central opening and an annular seating surface which registers with an annular seating surface on said first valve seat to stop the flow of fluid passing said seating surfaces from flowing from said inlet to said outlet passage;
a second valve seat disposed in said central opening of said first valve plug;
a second valve plug disposed in said central opening and having an annular seating surface which registers with an annular seating surface on said second valve seat to stop the flow of fluid passing said second seating surface from flowing from said central opening to said outlet passage;
a plurality of elongated ducts having small cross sectional dimensions relative to their length disposed in the first plug to provide a plurality of discrete jets of fluid which reduce the intensity of the noise produced by the fluid as it flows from said inlet passage to said central opening; and
a valve stem fastened to said second plug;
the first and second plugs being cooperatively associated in such a manner that when opening said valve, said second plug comes off said second seat and opens fully before said first plug comes off said first seat, and when closing said valve, said first plug contacts said first seat blocking the fluid flow between said first seating surfaces before the second plug begins to throttle the steam flow.

2. A valve as set forth in claim 1, further comprising means for locking the first and second plugs together so they act in unison, after said first plug is moved off the first seat as the valve opens and remain so locked until the first plug approaches said first seat as the valve closes.

3. A valve as set forth in claim 1 and further comprising a circumferential groove in the valve stem and latching means which register with said groove to latch the first and second plugs together after said first plug is moved off the first seat, and which allows the second plug to move independently when the first plug approaches said first seat.

4. A valve as set forth in claim 1 and further comprising guide means for aligning the seating surface of the first plug with the seating surface of the first seat.

5. A valve as set forth in claim 1 and further comprising guide means for aligning the first plug with the first seat, a circumferential groove in the valve stem, rods slidably mounted in radially extending bores in said first plug, biasing means for urging the rods in a radially outward direction, and cam surfaces on the guide means which cause said rods to register with said circumferential groove in the valve stem after the first plug is moved off its seat causing the first and second plugs to act in unison until the first plug approaches the first seat.

6. A valve as set forth in claim 1, wherein the ducts extend out radially from the central opening in the first plug.

7. A valve as set forth in claim 1 wherein there are a plurality of rows of radially extending ducts disposed in said first plug to provide a progressively increasing number of discrete jets of fluid as the second plug moves away from its seat, and thereby minimize the noise produced by the fluid as it flows from the inlet passage to the central cavity.

8. A valve as set forth in claim 1, wherein the central opening is concentric with the axis of the first plug and the central opening has three portions, a diverging portion which begins to diverge adjacent the second seat, a cylindrical portion having a relatively large diameter for receiving the second plug, and a guide portion through which the stem slides freely.

* * * * *